United States Patent
Yeh (12)

(10) Patent No.: US 10,216,683 B2
(45) Date of Patent: Feb. 26, 2019

(54) MULTIMEDIA COMMUNICATION APPARATUS AND CONTROL METHOD FOR MULTIMEDIA DATA TRANSMISSION OVER STANDARD CABLE

(71) Applicant: MStar Semiconductor, Inc., Hsinchu Hsien (TW)

(72) Inventor: Chun-Wen Yeh, Zhubei (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 117 days.

(21) Appl. No.: 15/293,477

(22) Filed: Oct. 14, 2016

(65) Prior Publication Data

US 2017/0139871 A1    May 18, 2017

Related U.S. Application Data

(60) Provisional application No. 62/254,729, filed on Nov. 13, 2015.

(51) Int. Cl.
*G06F 13/00* (2006.01)
*G06F 13/38* (2006.01)
(Continued)

(52) U.S. Cl.
CPC ...... *G06F 13/4081* (2013.01); *G06F 13/4022* (2013.01); *H04L 12/10* (2013.01)

(58) Field of Classification Search
CPC .......... G06F 13/00; G06F 13/38; G06F 13/40
See application file for complete search history.

(56) References Cited

U.S. PATENT DOCUMENTS

2010/0109795 A1* 5/2010 Jones .................... G06F 13/409
                                                    333/101
2012/0079140 A1* 3/2012 Bar-Niv .................. G06F 3/14
                                                    710/16
(Continued)

FOREIGN PATENT DOCUMENTS

TW        201414306 A     4/2014
TW        M511137 U     10/2015
TW        M511150 U     10/2015

OTHER PUBLICATIONS

TIPO Office Action, dated Dec. 14, 2016, 12 pages.

*Primary Examiner* — David E Martinez
(74) *Attorney, Agent, or Firm* — Edell, Shapiro & Finnan, LLC

(57) ABSTRACT

A multimedia communication apparatus, suitable for a first multimedia apparatus, is adapted to transmit or receive multimedia data and is electrically connectable to a standard connector. The standard connector may be non-reversibly or reversibly connected to a plug of a standard cable, and includes a plurality of the pins. The pins include multiple differential signal pins serving as multiple multimedia channels, a power pin serving as a power line, a first polarity pin, a first data pin and a ground pin. The multimedia communication apparatus includes a control logic and a multimedia signal processor. The multimedia signal processor transmits or receives multimedia data to/from a second multimedia apparatus through the multimedia channels, and further power handshakes or exchanges information with the second multimedia apparatus. The information is for controlling a multiplexer to switch the multimedia channels.

16 Claims, 8 Drawing Sheets

(51) Int. Cl.
*G06F 13/40* (2006.01)
*H04L 12/10* (2006.01)

(56) References Cited

U.S. PATENT DOCUMENTS

| | | | | |
|---|---|---|---|---|
| 2013/0115821 A1* | 5/2013 | Golko | ............... | H01R 13/516 |
| | | | | 439/638 |
| 2014/0105230 A1* | 4/2014 | Kabiry | ............... | H04J 3/02 |
| | | | | 370/537 |
| 2015/0363339 A1* | 12/2015 | Huang | ............... | G06F 13/10 |
| | | | | 710/33 |
| 2016/0335221 A1* | 11/2016 | Zhu | ............... | G06F 13/36 |
| 2016/0378971 A1* | 12/2016 | Dunstan | ............... | G06F 21/44 |
| | | | | 726/17 |

\* cited by examiner

MULTIMEDIA COMMUNICATION APPARATUS AND CONTROL METHOD FOR MULTIMEDIA DATA TRANSMISSION OVER STANDARD CABLE

This application claims the benefit of U.S. provisional application Ser. No. 62/254,729, filed Nov. 13, 2015, the subject matter of which is incorporated herein by reference.

BACKGROUND OF THE INVENTION

Field of the Invention

The invention relates in general to a multimedia system and associated control method, and more particularly to a multimedia system and associated control method for transmitting multimedia data over a standard cable.

Description of the Related Art

High Definition Multimedia Interface (HDMI™) is a trademark of HDMI Licensing, LLC, and provides an all-digital image and sound transmission interface. HDMI is applicable to set-top boxes, DVD players, personal computers, television game consoles, integrated amplifiers, digital sound systems and televisions. HDMI is capable of simultaneously transmitting non-compressed audio and video signals, and significantly simplifies installation complications of system wires as the audio and video signals used the same cable.

An HDMI transceiver adopts Transition-Minimized Differential Signaling (TMDS™) technologies, and encodes audio and video signals into data packets as TMDS data, which is then transmitted through a TMDS data channel as well as a TMDS clock channel. Each TMDS data channel supports a transmission speed up to 6 Gbps. An HDMI transceiver may also learn image transmission and reception capabilities of others through Display Data Channels (DDC) by using $I^2C$ signals to establish a correct multimedia link. Further, HDMI at the same time selectively offers a Consumer Electronics Control (CEC) function, which supports a function of operating multiple audiovisual devices using one single remote controller through a CEC channel that a signal line provides. HDMI further provides a function of Audio Return Channel (ARC), which allows the sound played by a television channel to return to an amplifier of a sound system.

Universal Serial Bus (USB) is a serial port bus standard connecting a computer system to an external device, and is also an input/output interface standard that not only is extensively applied in information communication products such as personal computers and mobile devices but also expands functions to photographing equipments, digital televisions, set-top boxes, game consoles and other related fields. In the year 2014, the USB Implementers Forum (IF) published the USB3.1 connection interface design standard, which includes USB Type-C™ (commonly referred to as Type-C). One major feature of a Type-C connector compliant to the Type-C specification is that, the upper and lower sides of the Type-C connector appear identical, in a way that the Type-C connector may be plugged in both directions, i.e., reversibly and non-reversibly connected.

FIG. 1 shows pin definitions of a Type-C receptacle defined by the Type-C specification. One Type-C receptacle includes 12 pins at each of its upper and lower sides. The pins A1, A12, B1 and B12 serve as ground lines GND. The pins A4, A9, B4 and B9 serve as bus power lines VBUS. According to the Type-C specification, the pins A6 and B6 are positive differential signal lines D+, and the pins A7 and B7 are negative differential signal lines D− to serve as a USB2.0 channel for transmitting USB2.0-compatible differential signals. The pins A2 and A3 provide a pair of SuperSpeed differential signal lines SSTX1+ and SSTX1− serving as a SuperSpeed differential signal channel SSTX1 for transmitting digital data at a speed as high as up to 10 Gbps. The pins A11 and A10 provide another pair of SuperSpeed differential signal lines SSRX2+ and SSRX2− serving as a SuperSpeed differential signal channel SSRX2 for receiving digital data at a speed as high as up to 10 Gbps. Similarly, the pins B2 and B3 provide a pair of SuperSpeed differential signal lines SSTX2+ and SSTX2− serving as a SuperSpeed differential signal channel SSTX2; the pins B11 and B10 provide another pair of SuperSpeed differential signal lines SSRX1+ and SSRX1− serving as a SuperSpeed differential signal channel SSRX1.

The pins A8 and B8 are respectively sideband use signal lines SBU1 and SBU2 for transmitting non-USB signals. For example, they may be used to transmit analog audio signals.

The pins A5 and B5 respectively serve as configuration channels (CC) CC1 and CC2. Through the pins A5 and A6, or the configuration channels CC1 and CC2, the polarity of a Type-C plug may be detected, i.e., whether the Type-C plug is non-reversibly or reversibly connected to a Type-C receptacle. Further, an upstream-facing port (UFP) and a downstream-facing port (DFP) connected at two ends of a Type-C cable may determine powering capabilities of the bus power line VBUS and the ground line GND according to a voltage dividing result generated by respective pull-up and pull-down resistors. The Type-C specification also provides a Power Delivery (PD) technology. In the standard mode of the Type-C specification, electronic devices connected at the two ends of a Type-C cable are capable of converting the USB PD protocol to Bi-phase Mark Coding (BMC) signals that may be transmitted to each other through the configuration channel CC1 or CC2, hence completing the handshake of power transmission of the UFP and the DFP.

Many electronic devices are equipped with both a USB socket and an HDMI socket. For example, the former is for connecting to an external memory, and the latter is for connecting to a display device. Different sockets need different cables, and more cables frequently lead to messier peripheral physical cables of these electronic devices. As the transmission speed of a Type-C cable is far greater than the transmission speed of an HDMI cable, transmitting HDMI signals using a Type-C cable may be a feasible solution. Therefore, there is a need for a solution that transmits HDMI signals using a Type-C cable while maintaining numerous technologies that the Type-C specification provides.

SUMMARY OF THE INVENTION

A control method suitable for a first multimedia apparatus is provided according to an embodiment of the present invention. The first multimedia apparatus includes a standard connector that may be non-reversibly or reversible connected to a plug of a standard cable. The standard cable includes a power line and a ground line, a first configuration channel and a second configuration channel, a multimedia channel, and a serial data line and a serial clock line. The control method includes: detecting a connection polarity of the standard cable through the first configuration channel and the second configuration channel to determine whether the standard cable is non-reversibly or reversibly connected to the standard connector; switching the serial data line and the serial clock line according to the connection polarity to establish a display data channel; power handshaking with a second multimedia apparatus through the display data channel; transmitting power with the second multimedia apparatus through the power line according to a power handshake result; and transmitting multimedia data with the second multimedia apparatus through the multimedia channel.

A multimedia communication apparatus is further provided according to an embodiment of the present invention. The multimedia communication apparatus is suitable for a first multimedia apparatus and is electrically connectable to a standard connector. The standard connector may be non-reversibly and reversibly connected to a plug of a standard cable, and includes a plurality of pins. The pins include a plurality of differential signal pins, a power pin, a first polarity pin, a first data pin and a ground pin. The differential signal pins serve as a plurality of multimedia channels. The power pin serves as a power line. The multimedia communication apparatus includes a control logic and a multimedia signal processor. The control logic checks a connection polarity of the standard cable through the first polarity pin to determine whether the standard cable is non-reversibly or reversibly connected to the standard connector. The multimedia signal processor, electrically connectable to the standard connector, transmits or receives multimedia data to/from a second multimedia apparatus through the multimedia channels. The multimedia signal processor further power handshakes or exchanges information with the second multimedia apparatus though the first data pin. The information is for controlling a multiplexer to switch the multimedia channels.

The above and other aspects of the invention will become better understood with regard to the following detailed description of the preferred but non-limiting embodiments. The following description is made with reference to the accompanying drawings.

DETAILED DESCRIPTION OF THE INVENTION

Figures 1, 2:
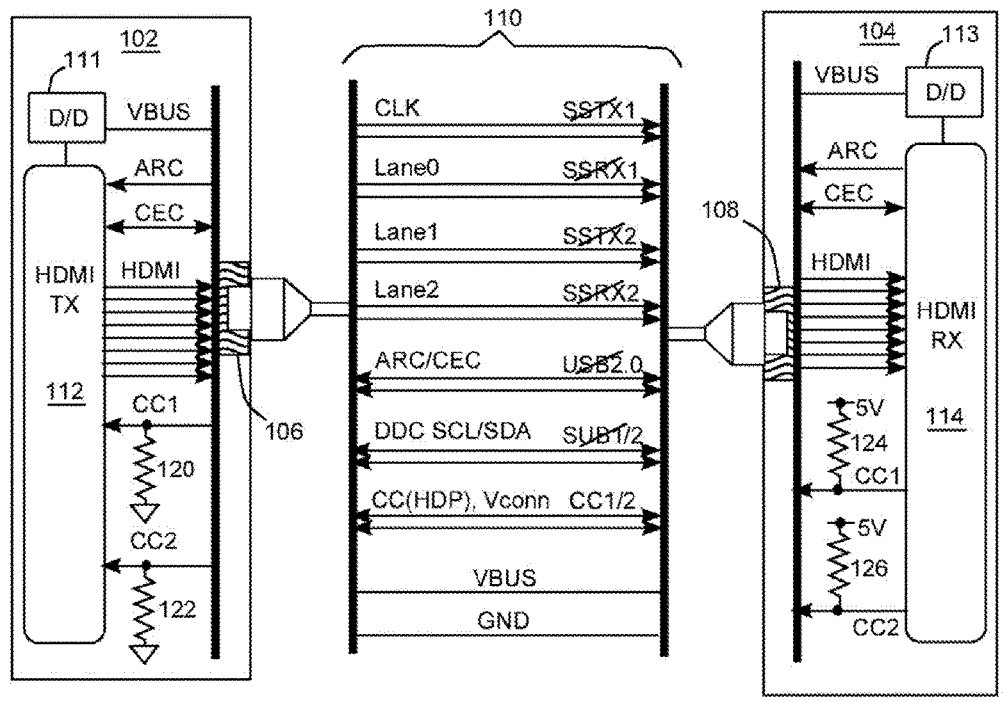
FIG. 1 shows pin definitions of a Type-C receptacle defined by the USB Type-C specification.
FIG. 2 is a multimedia system according to an embodiment of the present invention.

Throughout the application, the same denotations represent elements having identical or similar structures, functions and principles, and may be anticipated by one person skilled in the art based on the teaching of the application. To keep the application simple, elements of the same denotations are not repeatedly described.

According to an embodiment of the present invention, a multimedia signal source device and a multimedia signal sink device are connected to a cable through a Type-C connector. In an operation of a standard mode of the USB Type-C specification, the multimedia signal source device and the multimedia signal sink device transmit USB3.1-compliant signals through the Type-C connector and cable. The multimedia signal source device and the multimedia signal sink device are operable in an alternate mode to transmit HDMI signals by the Type-C cable. The multimedia signal source device includes an HDMI signal transmitter, and the multimedia signal sink device includes an HDMI signal receiver. Four pairs of SuperSpeed differential signal lines in the Type-C connector and cable respectively serve as three TMDS data channels and one TMDS clock channel to transmit TMDS data and clock. Each of the multimedia signal source device and the multimedia signal sink device similarly uses the configuration channels CC1 and CC2 in the Type-C connector and cable to determine the polarity of the Type-C plug connected thereto. Further, Hot Plug Detection (HPD) may also be implemented by the configuration channels CC1 and CC2 in the Type-C cable. In this embodiment, one of the multimedia signal source device and the multimedia signal sink device, through a display data channel (DDC) that is another data channel other than the configuration channels CC1 and CC2 in Type-C connector, may learn the connection polarity of the Type-C connector of the other of the multimedia signal source device and the multimedia signal sink device, so as to accordingly switch the TMDS channels and TMDS clock channel. Further, in this embodiment, through this DDC, the USB PD protocol may also be transmitted to accomplish USB PD handshaking.

A special benefit is provided by using a data channel other than the configuration channels CC1 and CC2 as a display data channel. That is, neither of the HDMI signal transmitter and the HDMI signal receiver needs to be designed with a special input/output device for transmitting Bi-phase Mark Coding (BMC) signals, and the HDMI signal transmitter and the HDMI signal receiver can communication with each other through a normal input/output device. Under the Type-C specification, only BMC signals can be transmitted in the configuration channels CC1 and CC2, and an input/output device with a special design is required because the signal swing of BMC signals is merely 1.125V. However, by adopting a data channel other than the configuration channels CC1 and CC2 as a display data channel, a signal having a full swing that is relatively slow in speed can be driven or received using a normal input/output device. In other words, in one embodiment of the present invention, input/output devices of the HDMI signal transmitter and signal receiver do not need to be especially designed to adapt to a Type-C connector, hence simplifying design complications.

FIG. 2 shows a multimedia system according to an embodiment of the present invention. The multimedia system in FIG. 2 includes a multimedia signal source device 102 and a multimedia signal sink device 104, which are connected to each other through Type-C connectors 106 and 108 and a Type-C cable 110. The multimedia signal source device 102 substantially serves as a downstream-facing port (DFP), includes an HDMI signal transmitter 112, and provides HDMI signals to a corresponding signal channel according to the HDMI specification. The multimedia signal sink device 104 substantially serves as an upstream-facing port (UFP), includes an HDMI signal receiver 114, and receives HDMI signals from a corresponding HDMI signal channel according to the HDMI specification. Different from the standard mode of the Type-C specification, the Type-C connectors 106 and 108 and the cable 110 in FIG. 2 operate in an alternate mode. In another embodiment, the multimedia signal source device 102 and the multimedia signal sink device 104 may operate in the standard mode of the Type-C specification, and transmit USB signals through the Type-C connectors 106 and 108 and the cable 110.

As shown in FIG. 2, in the Type-C connectors 106 and 108 and the cable 110, the four SuperSpeed differential signal channels SSTX1, SSR1, SST2 and SSRX2 in the original standard mode serve as three TMDS data channels Lane0, Lane1 and Lane2 and one TMDS clock channel CLK in the alternate mode. In other words, in the alternate mode, the four SuperSpeed differential signal channels SSTX1, SSRX1, SSTX2 and SSRX2, instead of transmitting SuperSpeed differential signals, transmit the TMDS data and clock that the HDMI signal transmitter 112 generates based on the TMDS technology. In FIG. 2, the SuperSpeed differential signal channel SSTX1 serves as the TMDS clock channel CLK, and the SuperSpeed differential signal channel SSRX1 serves as the TMDS data channel Lane0 as an example of the embodiment, and such example is not to be construed as a limitation to the present invention. For example, in another embodiment, the SuperSpeed signal channel SSTX1 serves as the TMDS data channel Lane0, and the SuperSpeed signal channel SSRX1 serves as the TMDS clock channel CLK. That is to say, the correspondence of the TMDS data channels Lane0, Lane1 and Lane2 and the TMDS clock channel CLK, and the SuperSpeed signal lines SSTX1, SSRX1, SSTX2 and SSRX2 is not limited to that shown in FIG. 2, and may be determined by a system designer based on actual needs.

As shown in FIG. 2, the multimedia signal source device 102 includes pull-down resistors 120 and 122, which are respectively connected to the pins A5 and B5 on the Type-C connector 106, i.e., the configuration channels CC1 and CC2. The multimedia signal sink device 104 includes pull-up resistors 124 and 126, which are respectively connected to the pins A5 and B5 on the Type-C connector 108, i.e., the configuration channels CC1 and CC2. The HMDI signal transmitter 112 may identify the connection polarity of the Type-C connector 106 through the pins A5 and B5 on the Type-C connector 106 to learn whether the Type-C cable 110 is non-reversibly or reversibly connected. The HDMI signal receiver 114 may identify the connection polarity of the Type-C connector 108 through the pins A5 and B5 on the Type-C connector 108.

In the Type-C specification, depending on the connection polarity of a Type-C plug plugged in a Type-C receptacle, one of the pins A5 and B5 on the Type-C connector 106 is shorted to one of the pins A5 and B5 on the Type-C connector 108 through the Type-C cable 110, whereas the other of the pins A5 and B5 on the Type-C connector 106 remains open-circuit with the other of the pins A5 and B5 on the Type-C connector 108. In other words, the Type-C cable 110 physically provides only one configuration channels. For example, in a connection polarity combination of a Type-C plug and a Type-C receptacle, the Type-C cable 110 causes the pin A5 on the Type-C connector 106 to be electrically shorted to the pin A5 on the Type-C, whereas the pin B5 on the Type-C connector 106 and the pin B5 on the Type-C connector 108 are kept open-circuit. The HDMI signal transmitter 112 may detect the potential on the pins A5 and B5 to learn the connection polarity of the Type-C connector 106 with a normal input/output device. For example, if the HDMI signal transmitter 112 discovers that the potential of the pin A5 on the Type-C connector 106 starts rising and the potential of the pin B5 on the Type-C connector 106 is kept at 0V, it means that the pin A5 on the Type-C connector 106 is connected to the HDMI signal receiver 114 through the Type-C cable 110, and the pin B5 on the Type-C connector 106 is not. Thus, it may be determined that the connection polarity of the Type-C connector 106 is non-reversible. Similarly, the HDMI signal receiver 114 may also use a normal input/output device to detect the potential on the pins A5 and B5 on the Type-C connector 108 to learn the connection polarity of the Type-C connector 108. For example, if the HDMI signal receiver 114 discovers that the potential of the pin B5 on the Type-C connector 108 starts falling and the potential of the pin A5 on the Type-C connector 108 is kept at a high voltage of 5V, it means that the pin B5 on the on the Type-C connector 108 is connected to the HDMI signal transmitter 112 through the Type-C cable 110, but the pin A5 on the on the Type-C connector 108 is not. Thus, it may be determined that the connection polarity of the on the Type-C connector 108 is reversible.

Similarly, when the multimedia signal source device 102 and the multimedia signal sink device 104 are initially electrically connected through the Type-C cable 110, the potential of one of the configuration channels CC1 and CC2 is changed. Thus, the HDMI signal transmitter 112 may perform hot-plug detection (HPD) through the pins A5 and B5 on the Type-C connector 106. Similarly, the HDMI signal receiver 114 may perform HPD through the pins A5 and B5 on the Type-C connector 108.

In the alternate mode in FIG. 2, the sideband use signal lines SBU1 and SBU2 are used as display data channels under the HDMI specification to transmit $I^2C$ signals to allow the HDMI signal receiver 114 and the HDMI signal transmitter 112 to learn the multimedia transmission and reception capabilities of each other. One of the sideband use signal lines SBU1 and SBU2 serves as a serial data line (SDA) and the other serves as a serial clock line (SCL), so that an instruction of the display data channel may be transmitted. Through the display data channel, the HDMI signal transmitter 112 may read the Extended Display Identification DATA (EDID) stored in the HDMI signal receiver 114 to determine types and formats of signals that the HDMI signal receiver 114 supports. For example, the HDMI signal transmitter 112 may learn the resolution that the HDMI signal receiver 114 is capable of outputting.

As shown in FIG. 2, in the alternate mode, the two differential signal lines (one connected to the pins A7 and B7 of the Type-C connector, and the other connected to the pins A6 and B6 of the Type-C connector) originally for USB2.0 channels serve as ARC and CEC of the HMDI specification.

The HDMI signal transmitter 112 and the HDMI signal receiver 114 may provide PD handshaking. In the alternate mode in FIG. 2, through the display data channel, i.e., the sideband use signal lines SBU1 and SBU2, the HDMI signal transmitter 112 and the HDMI signal receiver 114 may handshake for the required power specification to be supplied using $I^2C$ signals. In FIG. 2, the HDMI signal transmitter 112 learns the power specification the HDMI signal receiver 114 requires, and then the multimedia signal source device 102 controls a DC-to-DC power converter 111 to power the multimedia signal sink device 104 through the bus power line VBUS. In another scenario, through the PD handshaking of the display data channel, the multimedia signal sink device 104 may also control a DC-to-DC power converter 113 to power the multimedia signal source device 102 through the bus power line VBUS.

In FIG. 2, the PD handshaking required by the PD technology is completed though an instruction of the display data channel. The instruction of the display data channel may be completed by modifying associated firmware or software stored in the HDMI signal transmitter 112 and the HDMI signal receiver 114. Thus, the HDMI signal transmitter 112 and the HDMI signal receiver 114 can be realized by normal input/output devices instead of requiring a specially designed BMC transceiver (TRX). Such feature provides tremendous convenience in the design of the HDMI signal transmitter 112 and the HDMI signal receiver 114.

For example, the HDMI signal receiver 114 may read and write (access) registers A, B, C and D therein, and the HDMI signal receiver 112 may access the registers A, B, C and D in the HDMI signal receiver 114 through the display data channel by using $I^2C$ signals. The register A stores information of power that the HDMI signal transmitter 112 is capable of supplying or needs, and such information is written by the HDMI signal transmitter 112. The register B stores information of power that the HDMI signal receiver 114 is capable of supplying or needs, and such information is written by the HDMI signal receiver 114. If one side of the HDMI signal transmitter 112 and the HDMI signal receiver 114 needs external power, the register A or B is read to confirm whether the other side is capable of providing the required power. If the other side is capable of providing the required power, the one side that needs the external power writes the register C of the HDMI signal receiver to raise a request of asking the other side for power. The one side that provides the power may read the powering request in the register C, and starts providing power if the power supply capability of the one side providing the power is greater than or equal to the powering request of the other side, or else does not output power or only outputs the power capable of providing if the powering capability of the one side providing the power is smaller than or equal to the powering request of the other side. Further, the one side providing the power writes the information to the register D of the HDMI signal receiver 114 to allow the other side receiving the power to learn the information by reading the register D.

The HDMI signal transmitter 112 and the HDMI signal receiver 114 may transmit HDMI signals through the Type-C connector 110, and perform connection polarity detection and HPD of the Type-C connector 110 through the configuration channels CC1 and CC2. It is discovered from the above description that, both of the HDMI signal transmitter 112 and the HDMI signal receiver 114 can implement the PD technology without transmitting BMC signals.

Figure 3:
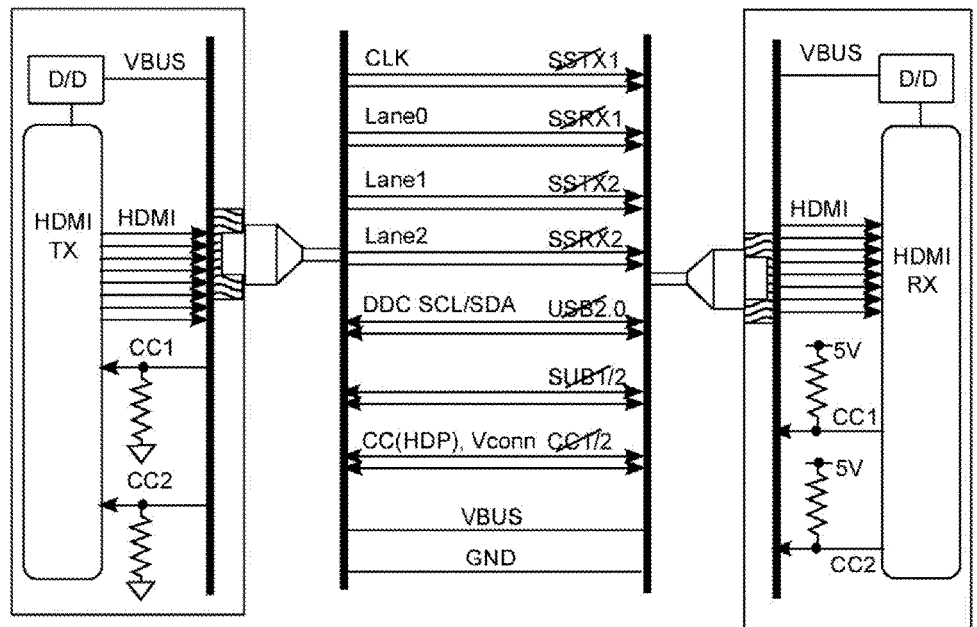
FIG. 3 to FIG. 5 depict three multimedia systems, respectively representing three alternate modes, according to embodiments of the present invention.
Figure 4:
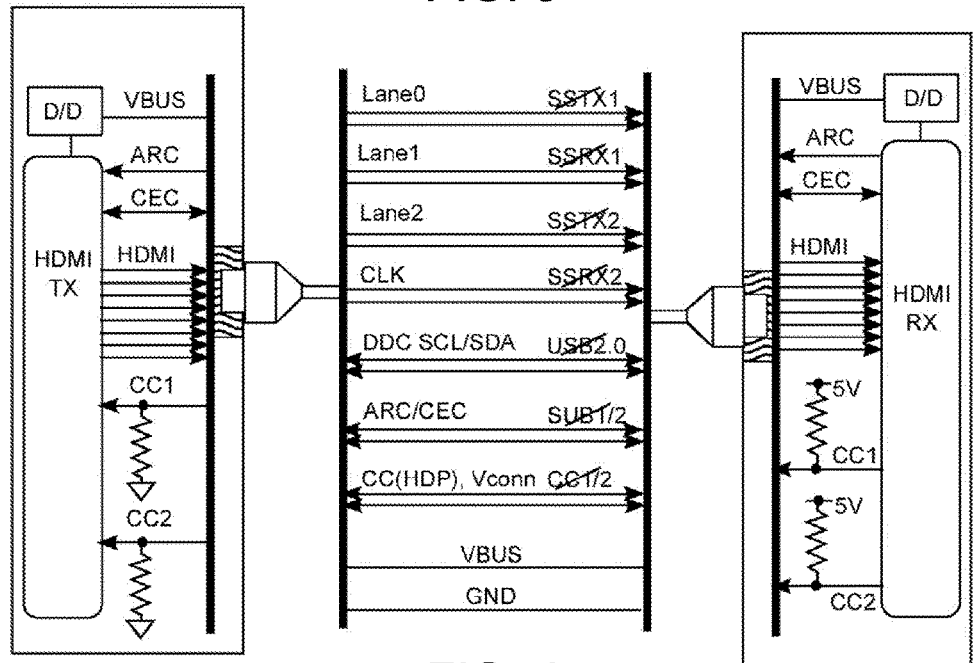
Figure 5:
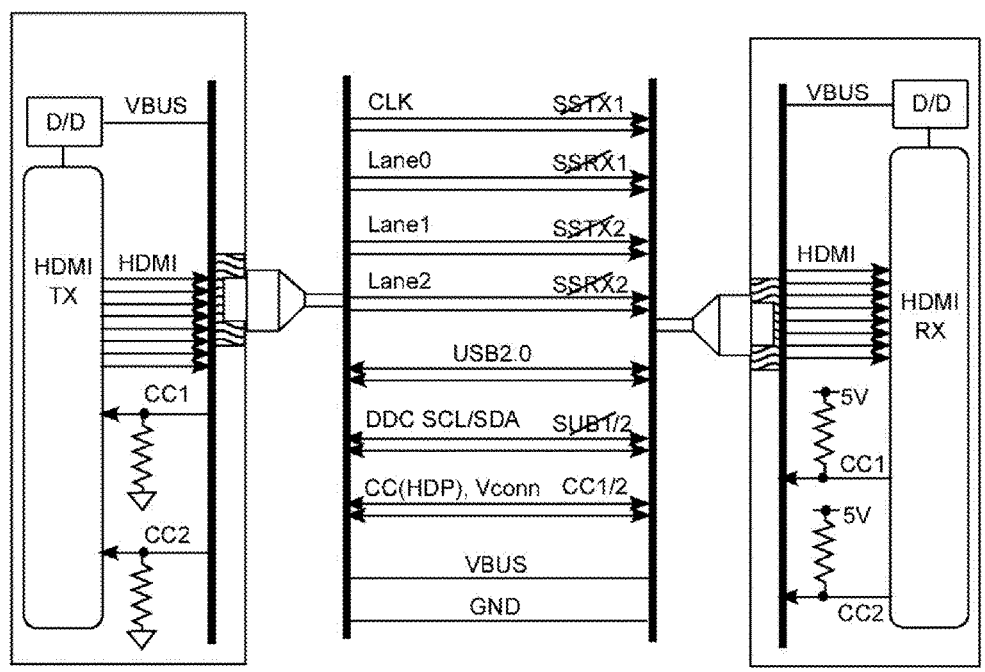

FIG. 2 is an example of an alternate mode according to an embodiment of the present invention, and is not to be construed as a limitation to the present invention. FIG. 3 to FIG. 5 further show three alternate modes according to embodiments of the present invention. Identical or similar parts to those in FIG. 2 are omitted herein for brevity. Each of the alternate modes in FIG. 3 to FIG. 5 performs connection polarity detection and HPD through the configuration channels CC1 and CC2, and also performs PD handshaking through the instruction of the display data channel.

In the alternate mode in FIG. 3, the two differential signal lines originally used as USB2.0 channels serve as SDA and SCL the display data channel requires, respectively. The sideband use signal lines SBU1 and SBU2 are reserved for other purposes.

In the alternate mode in FIG. 4, the two differential signal lines originally used as USB2.0 channels serve as SDA and SCL the display data channel requires, respectively. The sideband use signal lines SBU1 and SBU2 serve as ARC and CEC of the HDMI specification.

In the alternate mode in FIG. 5, the USB2.0 channel in the Type-C cable is kept unchanged and is still used for transmitting differential signals compatible with USB2.0. The sideband use signal lines SBU1 and SBU2 serve as display data channels of the HDMI specification.

Figure 6:
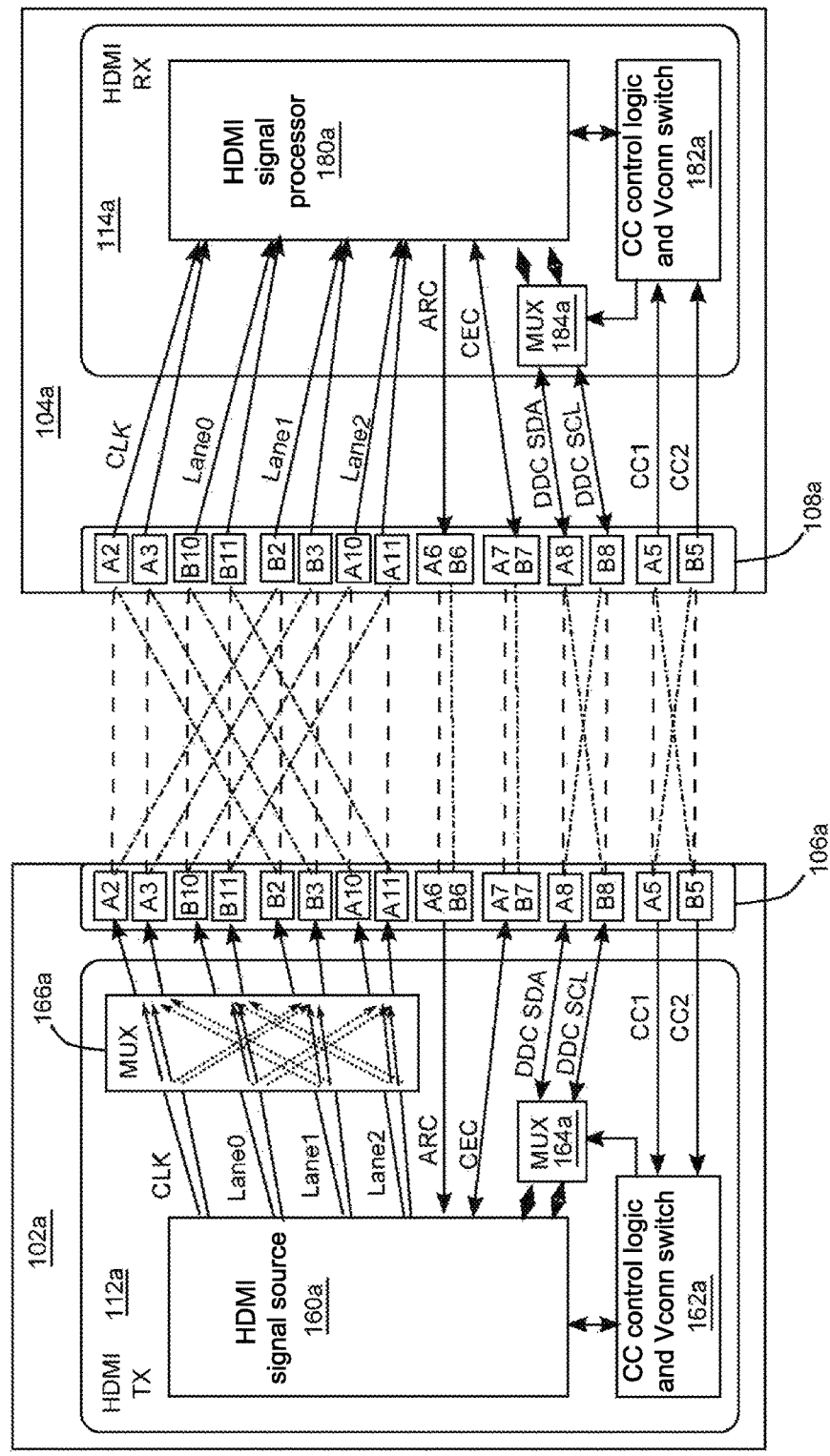
FIG. 6 shows a multimedia signal source device and a multimedia signal sink device respectively exemplifying a multimedia signal source device and a multimedia signal sink device in FIG. 2.

In FIG. 6, a multimedia signal source device 102a and a multimedia signal sink device 104a are examples for illustrating the multimedia signal source device 102 and the multimedia signal sink device 104 in FIG. 2.

The multimedia signal source device 102a includes a Type-C connector 106a and an HDMI signal transmitter 112a. The HDMI signal transmitter 112a includes an HDMI signal source 160a, a CC control logic and Vconn switch 162a, and multiplexers (MUX) 164a and 166a. The CC control logic and Vconn switch 162a identifies the connection polarity on the Type-C connector 106a through CC1 and CC2, and controls the multiplexer 164a to correctly transmit display data channel signals that the HDMI signal source 160a provides to the corresponding SDA and SCL. The HDMI signal source 160a provides HDMI-compliant signals to the TMDS clock channel CLK, TMDS data channels Lane0, Lane1 and Lane2 and CEC. The multiplexer 166a is capable of switching the TMDS clock channel CLK and the TMDS data channel Lane1, and simultaneously switching the TMDS data channels Lane0 and Lane2. How the channels are switched are determined based on the actual mapping between the channels and pins.

The multimedia signal sink device 104a includes a Type-C connector 108a and an HDMI signal receiver 114a. The HDMI signal receiver 114a includes an HDMI signal processor 180a, a CC control logic and a Vconn switch 182a for identifying the connection polarity on the Type-C connector 108a, and control a multiplexer (MUX) 184a to correctly connect SDA and SCL to corresponding input ports of the HDMI signal processor 180a. The HDMI signal processor 180a is directly connected to the TMDS clock channel CLK, the TMDS data channels Lane0, Lane1 and Lane2, ARC and CEC. It should be noted that, the multimedia signal sink device 104a does not include a multiplexer that switches the TMDS clock channel CLK and the TMDS data channel Lane1, or switch the TMDS data channels Lane0 and Lane3.

As shown in FIG. 6, due to the connection polarities on the Type-C connectors 106a and 108a, the mapping of the pins of the Type-C connector 106a and the Type-C connector 108a may be changed. For example, as shown in FIG. 6, under one connection polarity combination, the pin A2 of the Type-C connector 106a is electrically shorted to the pin A2 of the Type-C connector 108a. Under another connection polarity combination, the pin A2 of the Type-C connector 106a is electrically shorted to the pin B2 of the Type-C connector 108a.

Figure 7:
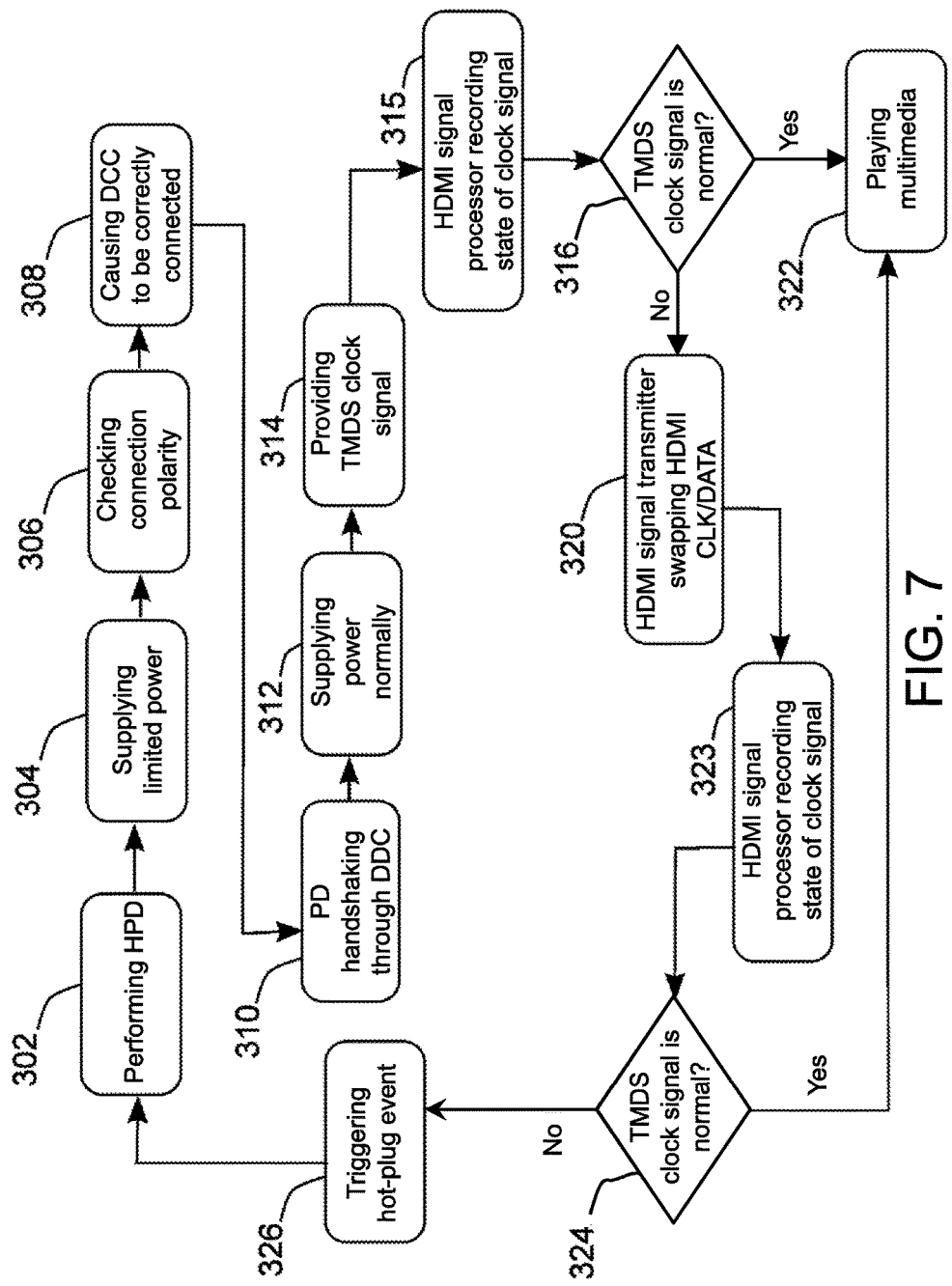
FIG. 7 shows a control method suitable for the multimedia signal source device and the multimedia signal sink device in FIG. 6.

FIG. 7 shows a control method suitable for the multimedia signal source device 102a and the multimedia signal sink device 104a in FIG. 6.

In step 302, the multimedia signal sink device 104a performs HPD to check through the configuration channels CC1 and CC2 whether the multimedia signal source device 102a is electrically connected to the multimedia signal sink device 104a through the Type-C cable.

In step 304 following step 302, after it is confirmed that the multimedia signal source device 102a and the multimedia signal sink device 104a are electrically connected, the multimedia signal sink device 104a supplies a safe and limited power to the multimedia signal source device 102a through the bus power line VBUS and the ground line GND, to provide the multimedia signal source 102a with limited power for logic operations. In another scenario, the multimedia source apparatus 102a may supply a safe and limited power to the multimedia signal sink device 104a through the bus power line VBUS and the ground line GND, to provide the multimedia signal sink device 104a with limited power for logic operations.

In step 306, through the configuration channels CC1 and CC2, the CC control logic and Vconn switch 162a identifies the connection polarity on the Type-C connector 106a. Meanwhile, through the configuration channels CC1 and CC2, the CC control logic and Vconn switch 182a identifies the connection polarity on the Type-C connector 108a.

In step 308, the CC control logic and Vconn switch 162a controls the multiplexer 164a according to the detected connection polarity on the Type-C connector 106a to correctly transmit the display data channel signals that the HDMI signal source 160a provides to corresponding SDA and SCL. Similarly, the CC control logic and Vconn switch 182a controls the multiplexer 184a according to the detected connection polarity on the Type-C connector 108a to correctly connect SDA and SCL to the corresponding input ports of the HDMI signal processor 180a. Thus, the display data channels between the HDMI signal processor 180a and the HDMI signal source 160a are correctly established.

In step 308, according to the connection polarity of the Type-C connector 106a, the multiplexer 166a selectively temporarily allocates the TMDS clock channel CLK, and the TMDS data channels Lane0, Lane1 and Lane2 to some pins of the Type-C connector 106a. Taking the TMDS clock channel CLK for example, if the Type-C connector 106a is non-reversibly connected, the multiplexer 166a allocates the TMDS clock channel CLK to the pins A2 and A3 of the Type-C connector 106a; if the Type-C connector 106a is reversibly connected, the multiplexer 166a allocates the TMDS clock channel CLK to the pins B2 and B3 of the Type-C connector 106a.

In step 310, the HDMI signal source 160a and the HDMI signal processor 180a perform PD handshaking through the display data channel.

According to the handshake result of step 310, in step 312, one of the HDMI signal processor 180a and the HDMI signal source 160a controls a DC-to-DC converter to provide a sufficiently large power to allow the other of the two to be operable.

With the power being ready, in step 314, the HDMI signal source 160a in the multimedia signal source device 102a starts providing TMDS clock signals to the TMDS clock channel CLK.

In step 315, the HDMI signal processor 180a checks whether the TMDS clock signal normally appears at the pins A2 and A3 of the Type-C connector 108a, and records the checked result in a register of the HDMI signal processor 180a. As shown in FIG. 6, in this alternate mode, the TMDS clock signal transmitted from the HDMI signal source 160a, after passing through the multiplexer 166a and the Type-C cable that might be reversibly connected, may appear either at the pins B2 and B3 or the pins A2 and A3 of the Type-C connector 108a. The pins A2 and A3 of the Type-C connector 108a are expectedly used as the TMDS clock channel CLK to allow the HDMI signal processor 180a with reception. Thus, at this point, the HDMI signal processor 180a may learn whether the TMDS clock channel CLK is connected by merely checking whether the TMDS clock channel normally appears in the TMDS clock channel CLK.

In step 316, the HDMI signal source 160a reads the checked result generated in step 315 and stored in the register to learn whether the HDMI signal processor 180a has correctly received the TMDS clock signal.

Step 322 is performed when the HDMI signal processor 180a has received the TMDS clock signal through the TMDS clock channel CLK. In step 322, the multimedia signal sink device 104a starts normally receiving the TMDS data and clock and plays the multimedia.

When the TMDS clock signal does not appear at the pins A2 and A3 of the Type-C connector 108a, the multimedia signal sink device 104 does not receive the TMDS clock signal. At this point, in an ideal situation, the TMDS clock is expectedly to appear at the pins B2 and B3 of the Type-C connector 108a. Thus, step 320 is performed, in which the HDMI signal transmitter 112a causes the multiplexer 166a to swap the TMDS clock channel and the TMDS data channel Lane1, and to swap the TMDS data channels Lane0 and Lane2. As such, the TMDS clock signal should correctly appear at the pins A2 and A3 of the Type-C connector 108a. The above channel swapping is an example, and the how the swapping is conducted is determined according to the actual pin definitions given by a designer.

Step 323 follows step 320. Similar to step 315, in step 323, it is checked whether the TMDS clock signal normally appears at the pins A2 and A3 of the Type-C connector 108a, and the checked result is recorded in the register of the HDMI signal processor 180a.

Step 324 follows step 323. Similar to step 316, in step 324, the HDMI signal source 160a reads the checked result generated in step 323 and stored in the register through the display data channel to learn whether the HDMI signal processor 180a has correctly received the HDMI clock signal. If so, step 322 is performed to start normally receiving the TMDS data and clock, and the multimedia is played. If not, it means that the multimedia signal source device 102a or the multimedia signal sink device 104a may contain certain issues and unexpected results have been generated.

When the result in step 324 is negative, in step 326, a physical or virtual plug event is triggered. For example, the HDMI signal processor 180a simultaneously pulls the pins A5 and B5 of the Type-C connector 108a to ground for a period of time and then releases the two. As such, the multimedia signal source device 102a deems that the Type-C cable has been virtually withdrawn and again plugged according to the detection result of the configuration channels CC1 and CC2. Thus, the multimedia signal source device 102a may be reset to eliminate certain possible issues.

Step 302 follows step 326 to re-start the entire control method.

It is seen from FIG. 6 and FIG. 7 as well as the associated description that, when the multimedia signal source device 102a includes a multiplexer for switching the TMDS clock and the TMDS data channels Lane0, Lane1 and Lane2 whereas the multimedia signal sink device 104a does not, the TMDS clock channel CLK and the TMDS data channels Lane0, Lane1 and Lane2 may be correctly established to transmit HDMI signals.

Step 316 in FIG. 7 may check whether the TMDS clock signal normally appears to identify whether the TMDS clock channel and the TMDS data channels Lane0, Lane1 and Lane2 have been correctly established. It should be noted that, the above example is not to be construed as a limitation to the present invention.

In an alternative embodiment, modifications may be made to FIG. 7, and the TMDS clock channel CLK and the TMDS data channels Lane0, Lane1 and Lane2 may still be correctly established. Step 314 is modified to providing TMDS data. Steps 315 and 323 are modified to that, the HDMI signal processor 180a checks and records whether the TMDS data correctly appears on one TMDS data channel to determine whether the TMDS clock channel CLK and the TMDS data channels Lane0, Lane1 and Lane2 have been correctly established. Steps 316 and 324 are modified to that, the HDMI signal source 160a learns through the display data channel whether the TMDS data normally appears on the TMDS data channel.

Figure 8:
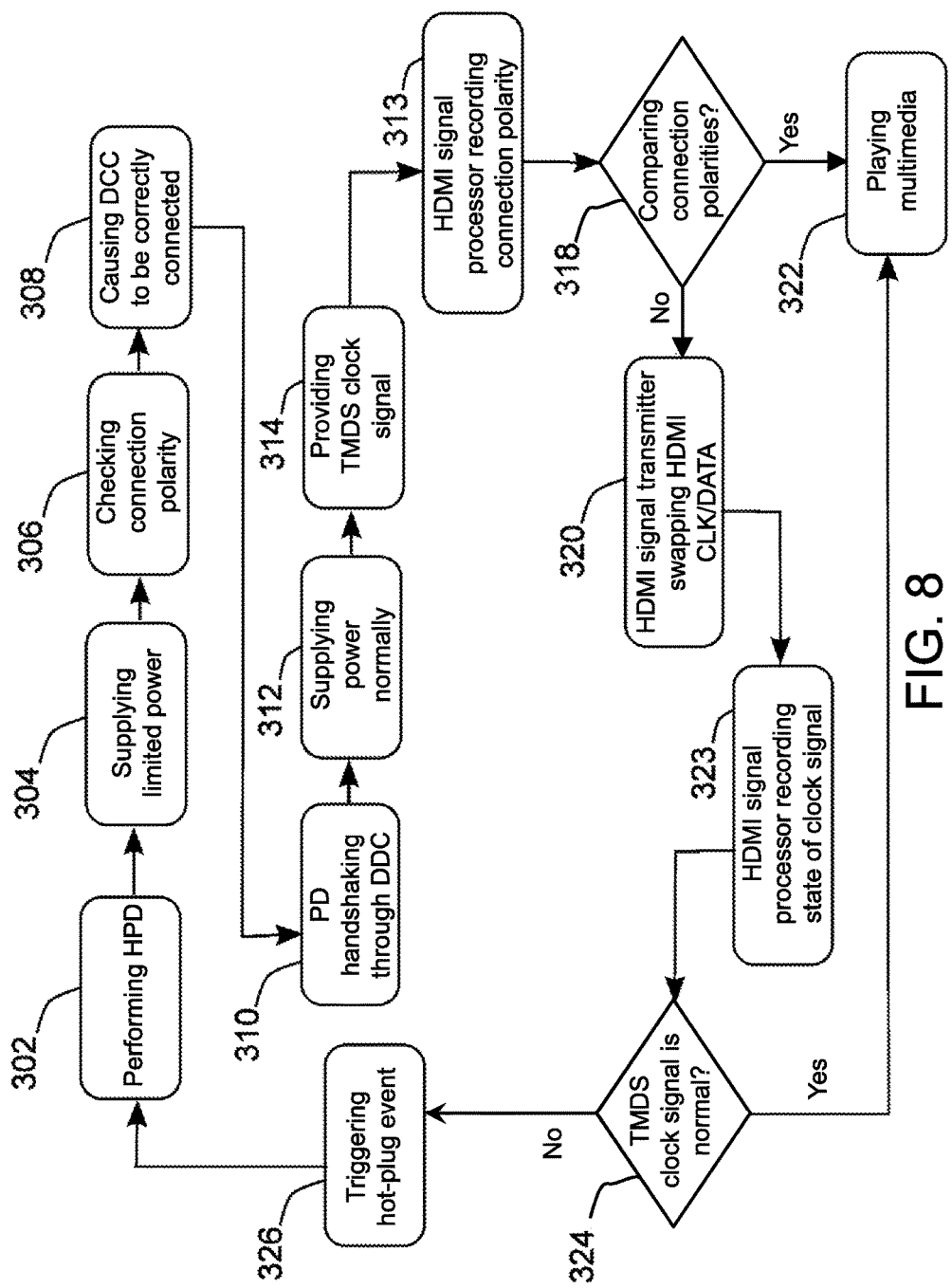
FIG. 8 shows another control method suitable for the multimedia signal source device and the multimedia signal sink device in FIG. 6.

FIG. 8 shows another control method suitable for the multimedia signal source device 102a and the multimedia signal sink device 104a in FIG. 6. According to the connection polarity, the TMDS clock channel CLK and the TMDS data channels Lane0, Lane1 and Lane2 are switched. Compared to FIG. 7, FIG. 8 does not include steps 315 and 316 but additionally includes steps 313 and 318. In step 313, the HDMI signal processor 180a records the checked result of the connection polarity of the Type-C connector 108a in step 306 in its register. In step 318, the HDMI signal transmitter 112 reads the register in the HDMI signal processor 180a through the display data channel to learn the connection polarity of the Type-C connector 108a, and compares the connection polarity of the Type-C connector 108a with the connection polarity of the Type-C connector 106a. For example, when both of the Type-C connectors 108a and 106a are non-reversibly connected or reversibly connected, the comparison result of step 318 is affirmative, and so step 322 directly plays the multimedia. Otherwise, the comparison result of step 318 is negative, step 320 switches the TMD clock channel CLK, and the TMDS data channels Lane0, Lane1 and Lane2. As such, the TMDS clock channel CLK and the TMDS data channels Lane0, Lane1 and Lane2 may also be correctly established.

Figure 9:
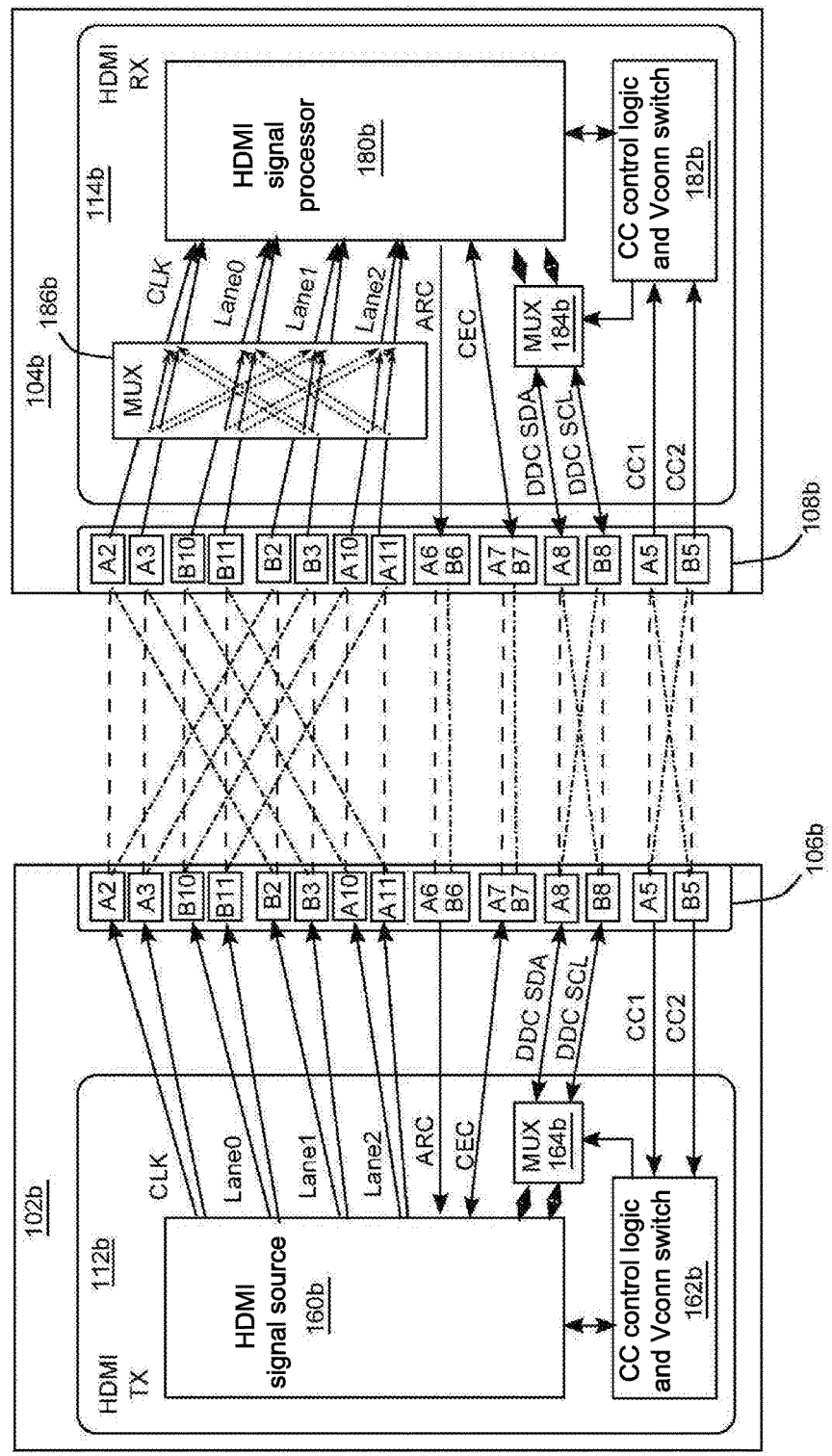
FIG. 9 shows a multimedia signal source device and a multimedia signal sink device respectively exemplifying the multimedia signal source device and the multimedia signal sink device in FIG. 2.

Referring to FIG. 9, a multimedia signal source device 102b and a multimedia signal sink device 104b are examples of the multimedia signal source device 102a and a multimedia signal sink device 104a in FIG. 2. Parts in FIG. 9 that are identical or similar to those in FIG. 6 may be understood with reference to the description associated with FIG. 6, and the repeated details are omitted herein for brevity. One difference of FIG. 9 from FIG. 6 is that, between pins A2, A3, B10 and B11 of the Type-C connector 106b and an HDMI signal source 160b, there is no multiplexer for switching the TMDS clock channel and the TMDS data channels Lane0, Lane1 and Lane 2. Further, compared to FIG. 6, the HDMI signal receiver 114a in FIG. 9 additionally includes a multiplexer 186b for switching the TMDS clock channel and the TMDS data channels Lane0, Lane1 and Lane 2.

Figure 10:
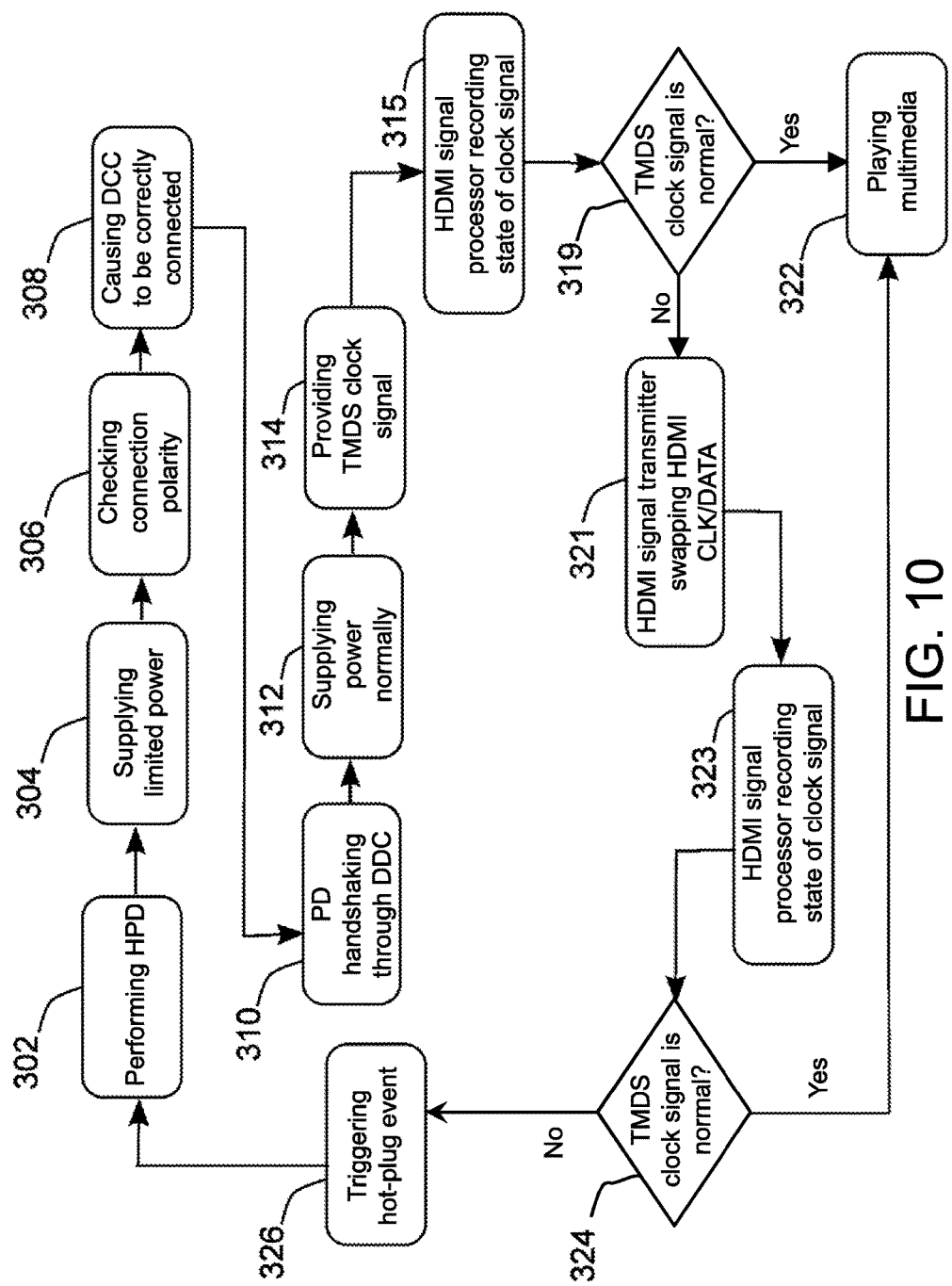
FIG. 10 shows a control method suitable for the multimedia signal source device and the multimedia signal sink device in FIG. 9.

FIG. 10 shows a control method suitable for the multimedia signal source device 102b and the multimedia signal sink device 104b in FIG. 9. Parts in FIG. 10 that are similar or identical to FIG. 7 may be learned with reference to the description associated with FIG. 6, and such repeated details are omitted herein for brevity.

Steps 316 and 320 in FIG. 7 are replaced by steps 319 and 321 in FIG. 10. In step 319, the checked result recorded in the register in step 315 is looked up. When the TMDS clock signal is not received by the HDMI signal processor 180b, it means that the TMDS clock signal is expected to appear at an incorrect receiving port of the HDMI signal processor 180b. In an ideal situation, given that the multiplexer 186b switches the channels, the TMDS clock signal is expected to appear in the correct corresponding port in the HDMI signal processor 180b. Thus, in step 321, under a condition that the HDMI signal transmitter 112b is not notified, the HDMI signal receiver 114b swaps the TMDS clock channel CLK with the TMDS data channel Lane1, and swaps the TMDS data channels Lane0 and Lane2. As such, the TMDS clock signal of the Type-C connector 108b should be correctly transmitted to the HDMI signal processor 180b.

It is discovered from FIGS. 8 and 9 and associated description that, when the multimedia signal sink device 104b includes a multiplexer for switching the TMDS clock channel CLK and the TMDS data channels Lane0, Lane1 and Lane2, but the multimedia signal source device 102b does not, the TMDS clock channel CLK and the TMDS data channels Lane0, Lane1 and Lane2 can be correctly established for transmitting HDMI signals.

Similar to the foregoing teaching, in FIG. 9, the switching basis of the multiplexer 186b is not limited to whether the TMDS clock signal normally appears. For example, the switching basis of the multiplexer 186b may be based on whether the HDMI signal processor 180b normally receives TMDS data from the TMDS data channel, or based on the result of the connection polarity comparison performed by the HDMI signal processor 180b.

The embodiments of the present invention achieve at least one of the following advantages.

1. Given that a Type-C receptacle is provided and a Type-C cable is used, the multimedia signal source device and the multimedia signal sink device are capable of transmitting HDMI signals without involving an HDMI socket.

2. Without any design of a special input/output device for transmitting BMC signals, the multimedia signal source device and the multimedia signal sink device are capable of PD handshaking.

3. USB2.0 signals may be transmitted between the multimedia signal source device and the multimedia signal sink device.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multimedia communication apparatus, suitable for a first multimedia apparatus, electrically connectable to a standard connector, the standard connector adapted to be non-reversibly or reversibly connected to a plug of a standard cable and comprising a plurality of pins, the pins comprising a plurality of differential signal pins, a power pin, a first polarity pin, a second polarity pin, a first data pin and a ground pin, the differential signal pins serving as a plurality of multimedia channels, the power pin serving as a power line, the multimedia communication apparatus comprising:

a control logic, checking a first connection polarity of the standard cable through the first polarity pin and the second polarity pin to identify whether the standard cable is non-reversibly or reversibly connected to the standard cable; and a multimedia signal processor, electrically connectable to the standard connector, transmitting or receiving multimedia data to/from a second multimedia apparatus through the multimedia channels, and power handshaking or exchanging information with the second multimedia apparatus through the first data pin, wherein the information is for controlling a multiplexer to switch the multimedia channels.

2. The multimedia communication apparatus according to claim 1, wherein the first multimedia apparatus performs a Hot-Plug Detection (HPD) function through the first or second polarity pin.

3. The multimedia communication apparatus according to claim 1, wherein the pins comprise a second data pin, the first multimedia apparatus and the second multimedia apparatus power handshake through a display data channel that the first data pin and the second data pin provide.

4. The multimedia communication apparatus according to claim 3, wherein the first multimedia apparatus and the second multimedia apparatus learn image transmission and reception capabilities of each other through the display data channel.

5. The multimedia communication apparatus according to claim 1, further comprising the multiplexer connected between the multimedia signal processor and the standard connector.

6. The multimedia communication apparatus according to claim 1, wherein the information comprises a second connection polarity between the second multimedia apparatus and the standard cable.

7. The multimedia communication apparatus according to claim 1, wherein the differential signal pins comprise a clock channel for transmitting a clock signal, and the information is generated according to whether the second multimedia apparatus correctly receives the clock signal.

8. A control method, suitable for a first multimedia apparatus comprising a standard connector and non-reversibly or reversibly connectable to a plug of a standard cable, the standard cable comprising a power line, a ground line, a first configuration channel, a second configuration channel, a first multimedia channel, a second multimedia channel, a clock channel, a serial data line and a serial clock line, the control method comprising:
  detecting a first connection polarity of the standard cable through the first configuration channel and the second configuration channel to identify whether the standard cable is non-reversibly or reversibly connected to the standard cable;
  switching the serial data line and the serial clock line according to the first connection polarity to establish a display data channel;
  power handshaking with a second multimedia apparatus through the display data channel;
  transmitting power to/from the second multimedia apparatus through the power line according to a power handshake result; and
  transmitting multimedia data to/from the second multimedia apparatus through the first multimedia channel.

9. The control method according to claim 8, further comprising:
  performing Hot-Plug Detection (HPD) through the first configuration channel and the second configuration channel.

10. The control method according to claim 8, further comprising:
  obtaining information associated with the second multimedia apparatus through the display data channel; and
  switching the multimedia channels according to the information.

11. The control method according to claim 10, wherein the standard cable further comprises a clock channel, and the information is generated according to whether the second multimedia apparatus correctly receives a clock signal through the clock channel.

12. The control method according to claim 10, wherein the information is generated according to whether the second multimedia apparatus correctly receives the multimedia data through the multimedia channel.

13. The control method according to claim 10, wherein the information is a second connection polarity between the second multimedia apparatus and the standard cable.

14. The control method according to claim 8, further comprising:
  switching the multimedia channel and the clock channel according to whether the first multimedia apparatus correctly receives a clock signal through the clock channel.

15. The control method according to claim 8, further comprising:
  switching the multimedia channels according to whether the first multimedia apparatus correctly receives the multimedia data through the multimedia channels.

16. The control method according to claim 8, further comprising:
  triggering a hot-plug event through the first configuration channel and the second configuration channel.

* * * * *

UNITED STATES PATENT AND TRADEMARK OFFICE
CERTIFICATE OF CORRECTION

PATENT NO. : 10,216,683 B2
APPLICATION NO. : 15/293477
DATED : February 26, 2019
INVENTOR(S) : Chun-Wen Yeh It is certified that error appears in the above-identified patent and that said Letters Patent is hereby corrected as shown below:

In the Claims

In Claim 1, at Column 12, Line 62, after "standard" delete "cable" and insert therefore --connector--.
In Claim 8, at Column 13, Line 43, after "standard" delete "cable" and insert therefore --connector--.

Signed and Sealed this
Fourteenth Day of March, 2023

Katherine Kelly Vidal
*Director of the United States Patent and Trademark Office*